(12) United States Patent
Gasperi

(10) Patent No.: US 8,890,494 B2
(45) Date of Patent: Nov. 18, 2014

(54) WIDE INPUT VOLTAGE RANGE POWER SUPPLY CIRCUIT

(75) Inventor: Michael Gasperi, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 249 days.

(21) Appl. No.: 13/297,494

(22) Filed: Nov. 16, 2011

(65) Prior Publication Data
US 2013/0121048 A1 May 16, 2013

(51) Int. Cl.
G05F 1/569 (2006.01)
G05F 1/44 (2006.01)
H02M 3/156 (2006.01)
H02M 1/00 (2006.01)

(52) U.S. Cl.
CPC ...... *H02M 3/156* (2013.01); *H02M 2001/0045* (2013.01); *H02M 2001/007* (2013.01)
USPC ............................. 323/266; 323/276; 323/285

(58) Field of Classification Search
USPC ................. 323/266, 271, 274–276, 282–285; 363/89; 361/18, 90, 92
See application file for complete search history.

(56) References Cited

U.S. PATENT DOCUMENTS

| 3,535,613 A | 10/1970 | Katzenstein |
| 3,777,253 A | 12/1973 | Callan |
| 4,054,830 A * | 10/1977 | Harrel ............................ 323/269 |
| 5,126,652 A | 6/1992 | Carlin |
| 5,132,893 A | 7/1992 | Klein |
| 5,296,800 A * | 3/1994 | Bjorkman et al. ............ 323/303 |
| 5,615,093 A * | 3/1997 | Nalbant .......................... 363/25 |
| 6,169,391 B1 * | 1/2001 | Lei ................................ 323/266 |
| 6,246,597 B1 | 6/2001 | Peron |
| 6,414,465 B1 * | 7/2002 | Banks et al. .................. 320/118 |
| 6,583,997 B1 | 6/2003 | Reid et al. |
| 7,486,030 B1 | 2/2009 | Biggs |
| 7,557,547 B2 | 7/2009 | Inagawa et al. |
| 7,576,958 B2 | 8/2009 | Bergh et al. |
| 7,715,216 B2 | 5/2010 | Liu |
| 8,203,810 B2 * | 6/2012 | Bryan et al. ..................... 361/13 |
| 8,223,468 B2 * | 7/2012 | Januszewski et al. ........ 361/111 |
| 2008/0025050 A1 | 1/2008 | Spindler |

FOREIGN PATENT DOCUMENTS

CN 101594053 12/2009

OTHER PUBLICATIONS

Albrecht, Jonathan J. et al. "Boost-Buck Push-Pull Converter for Very Wide Input Range Single Stage Power Conversion." IEEE 2005, pp. 303-308.

(Continued)

*Primary Examiner* — Adolf Berhane
*Assistant Examiner* — Gary Nash
(74) *Attorney, Agent, or Firm* — Quarles & Brady LLP

(57) ABSTRACT

A wide input voltage power supply circuit for a load includes a first regulation stage and a second regulation stage. The first regulation stage includes a linear regulator circuit configured to maintain a bus voltage within a predefined voltage range when an input voltage exceeds a predefined input level. A second regulation stage includes a buck converter circuit configured to regulate an average bus voltage to a predetermined load level. The second regulation stage includes an under voltage lockout configuration, with the under voltage lockout configured to set a minimum turn-on voltage for the load.

12 Claims, 4 Drawing Sheets

(56) References Cited

OTHER PUBLICATIONS

Alou, P. et al. "Flyback with Active Clamp: a Suitable Topology for Low Power and Very Wide Input Voltage Range Applications." IEEE 2002, pp. 242-248.

Voncina, Danijel et al. "Low Power Multiple Output DC Supply—Part I: Flyback Converter with Wide Input Voltage Range." IEEE 2006, pp. 668-671.

AN2625 Application Note. "High AC input voltage limiting circuit." ST Microelectronics 2008, pp. 1-17.

* cited by examiner

WIDE INPUT VOLTAGE RANGE POWER SUPPLY CIRCUIT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The subject matter disclosed herein relates generally to power supply circuits for a load, and, more particularly, to a power supply circuit that will allow a load, such as a relay, to be operated over a wide input voltage range while providing a minimum current operational threshold.

Many applications exist for switching devices such as relays. In general, such devices typically include one or more contacts which can be opened or closed in response to energization of the relay coil. Both electromechanical and solid state relays are commonly available. Sizes and ratings of such devices vary widely, depending upon the needs of particular applications, and upon such factors as whether the relay powers significant loads or simply provides low-level feedback. Families of relays are currently available that are quite small in physical packaging, and that can be mounted on circuit boards, and other relatively small supports.

One difficulty associated with families of electrical devices such as relays is the large number of catalog numbers and associated relays that need to be manufactured and warehoused. Typically, a relay is designed for only one specific supply voltage. If you are a manufacturer, you want to offer a full product line, which means offering a large variety of relays with installed coils that operate at one supply voltage. If you are an integrator or an OEM, this mean that you need to have available a large selection of relays that operate at different voltages for your application's needs. Attempts to accommodate devices to operate on more than one supply voltage results in increased size, cost, and heat generation.

Another difficulty associated with certain relay applications resides in the presence of leakage current from upstream circuitry used to energize the relay coil. In certain relays, particularly in smaller size relays, such as those mountable on circuit boards and other small support structures, even low levels of leakage current can cause the relay coil to be energized when such energization is not desired, thereby causing the relay to open or close in an undesirable fashion, greatly reducing their reliability. Similarly, such leakage current can cause the coil to remain energized a sufficient degree to prevent shifting of the contact or contacts upon removal of a control signal to the coil. In either case, the reliability of the relay and the signals produced by the relay can be jeopardized by the leakage current.

There is a need, therefore, for an improved technique for controlling relays and similar loads. There is a particular need for a power supply circuit that can accept a wide range of input voltages to allow fewer catalog numbers to be required, while at the same time, that can improve reliability by allowing coil energization only when a predetermined minimum current threshold is available to the relay circuit.

BRIEF DESCRIPTION OF THE INVENTION

The present embodiments overcomes the aforementioned problems by providing a circuit that can regulate the input signal voltage so that a single relay can be used over a wide input voltage range. A two stage regulation may be used such that a first pre-regulation stage lowers the input voltage to a level that can be tolerated by the relay coil. The second stage further regulates the average voltage to a predetermined coil level. By pre-regulating to a predetermined range between about 80VDC to about 120VDC, a single coil can be used in a wider application range, replacing many catalog numbers with a single catalog number. The second stage also permits current through the coil, only if the applied control signal exceeds a minimum current threshold.

Embodiments are particularly well-suited to small relay circuits, such as those used in circuit board-mountable or similar relays that have limited heat dissipation capabilities. Moreover, the embodiments may be used for circuits where control signals are applied in either alternating current (AC) or direct current (DC) form. The circuitry can effectively accept a wide range of voltage inputs, with the present embodiments being effective from between about 24V AC/DC to about 240V AC/DC, although it is to be appreciated that lower and higher voltages are considered.

In accordance with one embodiment of the invention, a wide input voltage power supply circuit for a load includes a first regulation stage and a second regulation stage. The first regulation stage includes a linear regulator circuit configured to maintain a bus voltage within a predefined voltage range when an input voltage exceeds a predefined input level. A second regulation stage includes a buck converter circuit configured to regulate an average bus voltage to a predetermined load level. The second regulation stage includes an under voltage lockout configuration, with the under voltage lockout configured to set a minimum turn-on voltage for the load.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE INVENTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention.

The following description refers to elements or features being "connected" or "coupled" together. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically. Thus, although schematics shown in the figures depict example arrangements of processing elements, additional intervening elements, devices, features, components, or code may be present in an actual embodiment.

Embodiments of the invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., digital signal processing elements, logic elements, diodes, etc., which may carry out a variety of functions under the control of one or more microprocessors or other control devices. Other embodiments may employ program code, or code in combination with other circuit components.

Figure 1:
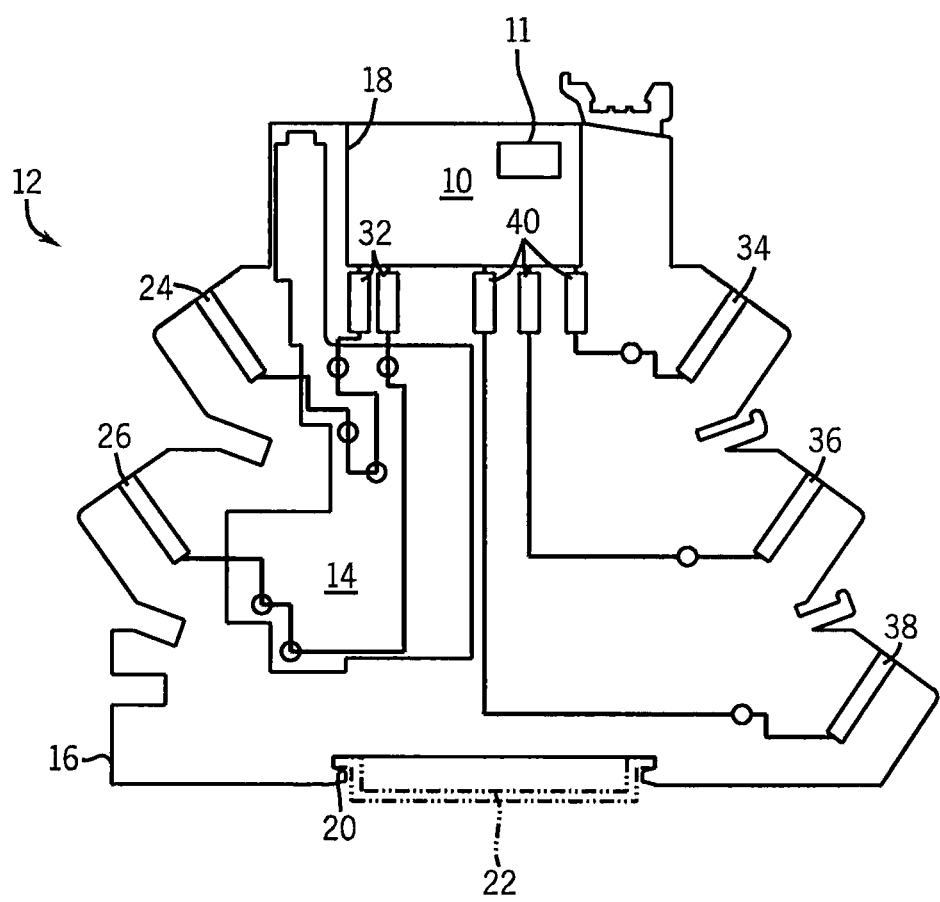
FIG. 1 is a diagrammatical representation of a terminal block incorporating a wide input voltage range power supply according to embodiments of the present invention.

Turning now to the drawings, and referring first to FIG. 1, a relay 10 is illustrated in an exemplary embodiment as being supported on a terminal block 12. Relay 10 may be designed to be received on the terminal block and to receive control signals, and to produce output signals as summarized more fully below. The terminal block 12 may support a circuit board 14 that is designed to provide a control power to the relay and to carryout control functions in accordance with embodiments of the invention.

In the diagrammatical representation of FIG. 1, terminal block 12 is illustrated as including a housing 16 in which the circuit board 14 is mounted. In practice, the circuit board may be covered with a mating housing section or end cap (not shown), where desired. A bay or recess 18 may be provided in an upper section of the terminal block 12 for receiving the relay 10. In the illustrated embodiment, the terminal block 12 is designed to be mounted via a mounting interface 20 at its lower extremity. The mounting interface 20 in the illustrated embodiment may interface with a DIN rail 22 of conventional design.

In the implementation of FIG. 1, the terminal block 12 provides connection points or terminals for control inputs for regulating energization of a coil 11 within relay 10, and for outputting signals from the relay in response to the control input. For example, in the diagrammatical representation of FIG. 1, input terminals 24 and 26, one of which will typically be a neutral input, are provided on a first side of the terminal block housing. As known in the art, the inputs 24 and 26 may be connected to conductive pads on the circuit board 14, and traces may extend on the circuit board and permit interconnection of the inputs with the relay 10. Contacts 32 are designed to route electrical control signals from inputs 24 and 26 to relay 10 for energizing the relay coil 11 as described below.

In addition to inputs 24 and 26, terminal block 12 presents output terminals 34, 36 and 38. The output terminals are designed to provide output signals to downstream circuitry based upon the conductive state of relay 10. The output terminals 34, 36 and 38 are linked to respective contacts 40 which are electrically coupled to relay 10 when inserted in the terminal block housing 16. As will be appreciated by those skilled in the art, output terminals 34, 36 and 38 will typically provide for common, normally-open and normally-closed wiring.

Relay 10 operates in a conventional manner when control signals are applied to it via inputs 24 and 26 and circuit board 14. That is, when electrical current is applied to the relay coil 11, contacts within the relay are closed to provide an output signal at contacts 40 and thereby at output terminals 34, 36 and 38.

While in the present discussion, reference is made to a terminal block-mounted relay 10, it should be understood that the embodiments of the invention may be applied to a wide range of circuits and devices, including relays mounted other than on a terminal block. Accordingly, the circuit configuration discussed herein may be applied to circuit board-mountable relays, one or multiple pole relays, as well as relays and other devices having substantially different packaging. In general, embodiments provide a power supply circuit that will allow a load, such as a relay, to be operated over a wide input voltage range while providing a minimum current operational threshold. It should also be noted, that in addition to conventional electromechanical relays, embodiments of the present invention may be equally well employed for solid state relays.

Figure 2:
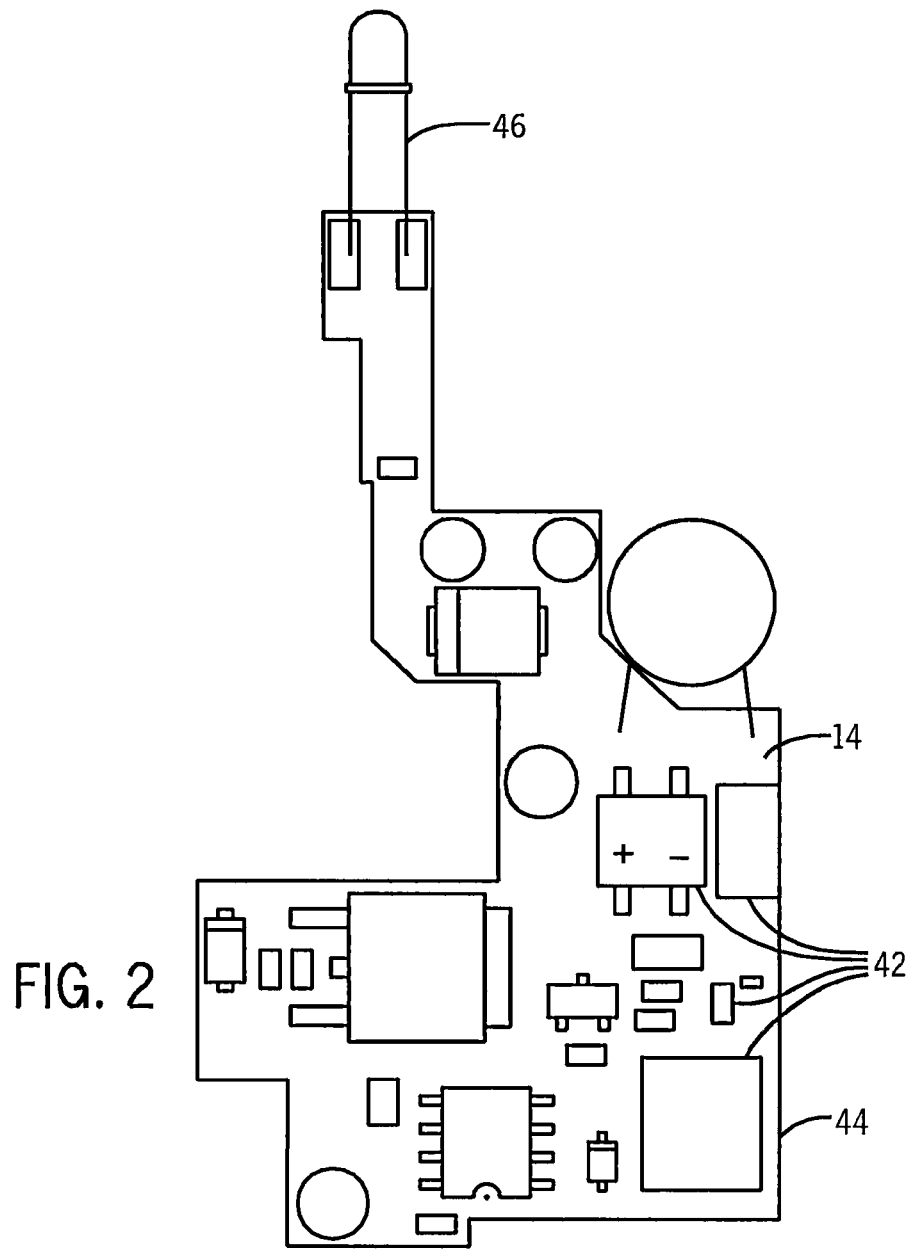
FIG. 2 is an exemplary elevational view of a printed circuit board on which a circuit according to embodiments of the present invention may be mounted in a terminal block, such as that illustrated in FIG. 1.

FIG. 2 illustrates an exemplary circuit board configuration on which the power supply circuit described below may be supported. In the embodiment illustrated in FIG. 2, the circuit board 14 may be contoured so as to fit within a portion of a terminal block housing of the type illustrated in FIG. 1. Circuit components 42, for example, are mounted on one or more surfaces of the circuit board 14, and interconnected as described below. A periphery 44 of the circuit board provides a convenient interface for engagement of the circuit board within the support housing 16. However, other alternative mounting structures and schemes may be envisaged. In some embodiments, an extremity of the circuit board may support an LED 46 that provides a visual indication of the conductive state of the circuitry described below. The LED 46 may be made visible at a convenient side or edge surface of the support housing, such as along an upper edge of the terminal block illustrated in FIG. 1.

Figure 3:
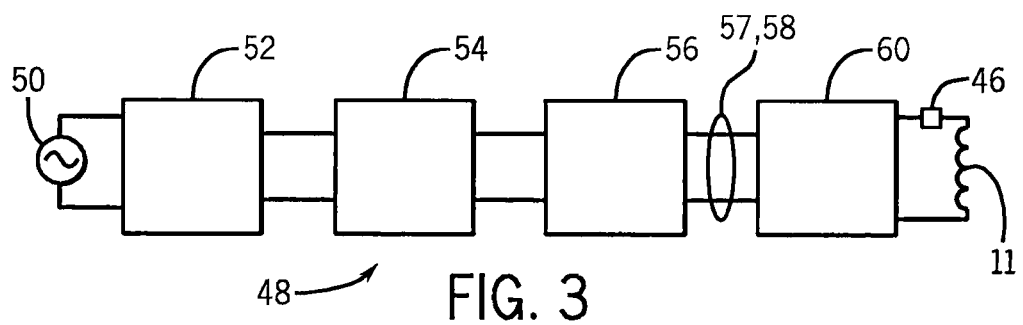
FIG. 3 is a functional block diagram of a control circuit according to embodiments of the present invention.

An exemplary embodiment will now be described and is shown in FIG. 3. A power supply circuit 48 is provided that can operate one or more small loads, such as a relay coil 11, as a non-limiting example, generically over a predetermined input range between about 24V AC/DC to about 240V AC/DC, or about 24V AC/DC to about 264V AC/DC, or about 12V AC/DC to about 264V AC/DC. The input range ratio may be about 1 to 10, or about 1 to 15 or about 1 to 20, for example. The design of the power supply circuit is particularly challenging due to the limited thermal pathways in not only the relay 10, but in the terminal block 12 as well, and each can only afford a small amount of waste heat before an internal temperature rise becomes excessive. Another challenge for the circuit design was to include a minimum operating current feature so, for example, the relay could be used reliably with triac type PLC outputs that have high leakage current.

The power supply circuit 48 serves both to condition input signals and to regulate application of current to the downstream device, in the illustrated example the relay coil 11. Thus, the circuit 48 is configured to accept a control signal 50, which may be either an alternating current or a direct current providing a voltage input range from about 24V AC/DC to about 240V AC/DC.

Certain relay coil factors need to be understood in relation to the predetermined input range between about 24V AC/DC to about 240V AC/DC. Considering a −20% minimum turn on voltage for a 24V coil equals 19.2V, plus additional voltage drops in the circuit, such as two diodes from the rectifier circuit 54 (two diodes at about 0.65V equals about 1.3V), the indicator LED 46 in series (about 1.8V), and other voltage drops, cause the voltage at the relay 10 to be about 4V below the input. In this configuration, the relay coil 11 would only see about 15.2V with a 19.2V minimum input. 15.2V would be considered dangerously below the minimum operating range for a typical 24V relay. This would be especially true at elevated temperatures. Therefore, in order to provide an input range between about 24V AC/DC to about 240V AC/DC, a 12V relay may be used because it should energize with less than the calculated 15.2V.

Another important aspect of the relay coil 11 is its operating current. Knowing that the relay 10 is thermally limited and that the coil's operating current directly affects the heat losses, it was determined that the circuit 48 should be designed for the minimum recommended relay current. In one representative relay example, nominally, the 12V relay would be set for 12V across an 848 ohm coil resistance, or 14 mA, but a representative relay is also guaranteed (at 23 degrees C.) to close with 8.4V, or as little as 10 mA. At 50 degrees C., the minimum recommended operating voltage with a 6 A load is 10.2V, which would imply about 12 mA.

Based on representative coil factors, it appears that 12.5 mA would be a reasonable minimum design goal since it is only −10% from nominal and exceeds any lower recommended operating current. This current may be set by a shunt resistor 68 in the buck converter circuit 60 discussed below.

A signal conditioning circuit 52 appropriately regulates the incoming control signal 50 for application to a rectifier circuit 54. Circuit 54 serves to rectify alternating current control signals to produce direct current waveforms. While the rectifier circuit 54 is unnecessary in applications where a direct current input control signal is available, the circuit may be included in all implementations, where desired, to provide for application of either alternating current or direct current input signals.

The power supply circuit 48 includes a cascaded topology of a linear regulator 56 followed by a buck converter 60. Through calculation, it has been found that it would not be possible to perform the entire conversion with a single buck converter because the relay's wire insulation cannot be exposed to voltages as high as a rectified 240VAC. A single linear regulator would also not be possible due to the excessive heat it would generate. Therefore, the linear regulator circuit 56 sets the maximum voltage to the relay coil 11 while the buck converter 60 reduces the average voltage further to a desired operating point of the relay coil.

The cascaded topology includes the linear regulator circuit 56 provided along a DC bus 57 downstream of the rectifier circuit 54. The linear regulator circuit 56 serves to limit the voltage to a desired maximum acceptable to the relay coil 11. In the embodiment described herein, the desired range for the circuit is between about 80V to about 120V.

Selection of the intermediate DC bus voltage 58 is a compromise between overall efficiency and the maximum voltage the relay coil 11 can tolerate. The total dissipated power is dominated by the loss in the linear regulator circuit 56 that continuously drops off with higher intermediate voltage. Because the relay 10 is thermally limited, the intermediate voltage is entirely determined by the maximum voltage that can be applied to the relay coil 11, which is determined by the minimum breakdown voltage rating of the coil's wire insulation.

Again, certain additional coil factors need to be understood in relation to the minimum breakdown voltage rating of the coil's wire insulation. It is known that enamel insulated wire minimum breakdown voltage generally increases with wire size. Based on available coil data, a calculated lowest minimum breakdown voltage would be 125V, but may be over 150V if better quality insulation was used. With a 10% margin added, the intermediate voltage is calculated to be about 112.5V. In the circuit configuration shown in FIG. 6, an actual voltage applied to the coil 11 may be about 2V less than the intermediate bus voltage 58 due to the voltage drop in the LED 46, an FET 66, and a shunt resistor 68. These voltage drops make the realistic voltage margin more like 25% of a minimum insulation specification. Admittedly close, but necessary due to thermal limits. If other constraints could be relaxed, this voltage could be reduced.

In one relay example, the maximum coil voltage for a 24V relay is 125V based on EN standard. The wire in the 12V relay would be thicker and have at least equal breakdown voltage. Using available relay data, at zero degrees C., the 60V relay can actually be operated with 2.58 times the rated voltage or 155V. The wire in the 12V relay would have at least equal breakdown voltage of that used in the 60V relay.

The measured diameter of an actual 12V relay wire is 0.032 mm including the insulation. Some published data on enamel coated magnet wire implies that, with the lowest grade (1B) insulation, the coil wire has a minimum rated breakdown of 150V.

Figure 4:
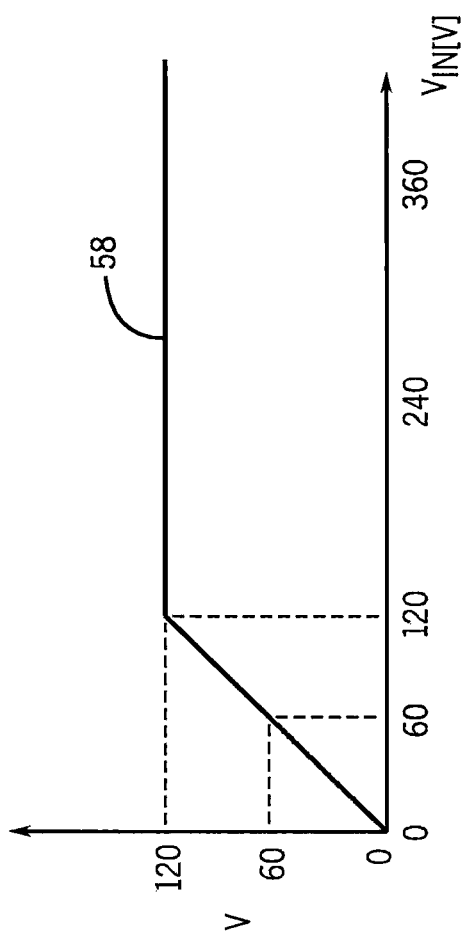
FIG. 4 is a graph showing a function of the control circuit according to embodiments of the present invention.

The output of the linear regulator circuit 56 can be calculated as a zener voltage minus a gate turn off voltage of a FET 66, which is a negative value. In one example, a DN2470 from Supertex Inc. has a nominal gate voltage of −2.5V, so an 110V zener diode 76 could be used to create an 112.5V intermediate bus voltage. FIG. 4 shows an example of the voltage input being limited to an intermediate DC bus voltage 58 of 120V. The linear regulator 56 cuts off higher voltages while allowing voltages below the predetermined threshold to pass.

In some embodiments, the linear regulator 56 uses a depletion mode FET 66 because this type of FET conducts even when the gate voltage is zero. An advantage of the depletion mode FET is that it has no minimum operating voltage and simply passes current when below the regulated voltage. In an alternative embodiment, an enhancement mode FET may be used, which generally would be less expensive, but it would also drop about an additional 4V before it started to operate. Other voltage drops in the circuit (1.7V rectifier circuit 54, 1.8V LED 46, 1V input resistor 72, 0.5V in FET 66 and shunt resistor 68, totaling about 5V) would cause the voltage at the relay 10 at 19.2V input to be less than 12V. This may be manageable, but use of the more expensive depletion mode FET avoids possible complications with low voltage operation.

With the depletion mode FET 66, the gate voltage must be several volts below the source to turn off conduction. The linear regulator 56 is basically connected as a follower where the gate voltage is determined by the zener diode 76. The source will rise to the zener voltage minus the gate turn off voltage (about −2.5V). Any additional voltage on the drain will be simply dropped across the FET.

There is essentially no current or heat dissipated in the zener diode 76, but it does need physical spacing to accommodate the 110V drop. Because the FET 66 gate doesn't require any current, 1 Meg ohm is all that is needed as a pull-up resistor 78. A capacitor 80 in parallel with the resistor helps the initial rise time on the intermediate bus 57 when the relay 10 is switched on. It also limits the degree to which the linear regulator 56 tries to regulate a PWM frequency ripple. This helps reduce the Electromagnetic Interference (EMI) getting back to the input terminals 24 and 26.

As previously discussed, relays may also be used to buffer triac outputs from Programmable Logic Controllers (PLCs). Triacs are known for having off state leakage current in the low milliamp range. Some small general purpose relays have a rated release voltage, and hence current, so low that a triac leakage current can maintain a relay in an energized state even though it is supposed to be turned off. A buck converter circuit 60 is provided along the intermediate DC bus 57 to require that a current value higher than the triac leakage current is necessary for operation of the coil.

In one embodiment, a buck converter 62 may be used that includes an under voltage lockout (UVL) 64 feature. One example of a buck converter incorporating this feature is the Supertex HV9910B. Another example is the Diodes Incorporated AL9910. The buck converter 62 is designed to not start operation until the input voltage exceeds about 7V and will stop operation when the voltage drops below about 6.5V. By adding a zener diode 82 in series with the buck converter's power pin, the UVL level can be increased to any desired level.

As previously discussed, in one embodiment, the minimum turn on voltage for the relay coil is −20% of the nominal 24V or 19.2V. The UVL can be set to about 15.2V by adding an 8.2V zener diode 82 to the intermediate DC bus 57 (about 7V plus about 8.2V equals 15.2V). Again as previously discussed, due to two silicon diodes in the rectifier circuit 54 and other voltage drops in the front end, the input voltage would likely be around 17V at this point. This voltage allows some additional margin for low side operating voltage. At the UVL dropout point, which is only about 0.5V lower, the current draw from the coil 11 should be above 3 mA.

Figure 5:
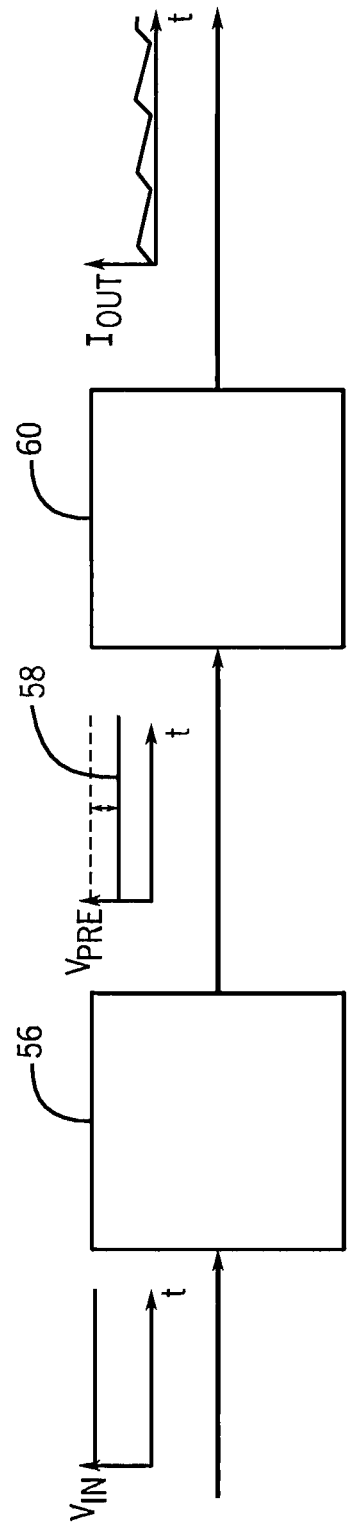
FIG. 5 is a graph showing a function of the control circuit according to embodiments of the present invention.

FIG. 5 shows a diagram of the linear regulator 56 and buck converter 60 arrangement. The buck converter 60 senses peak current, and adapts the duty cycle accordingly to keep it close to constant. From an input range of about 19V to about 120V, only the buck converter 60 regulates, and the linear regulator 56 doesn't consume significant power. Above an 120V input voltage, the linear regulator 56 kicks in and clips off the voltage to a level safe for the relay coil 11. Operating in this way, the conversion ratio and the dissipated power is split up over the linear regulator 56 and buck converter 60.

Figure 6:
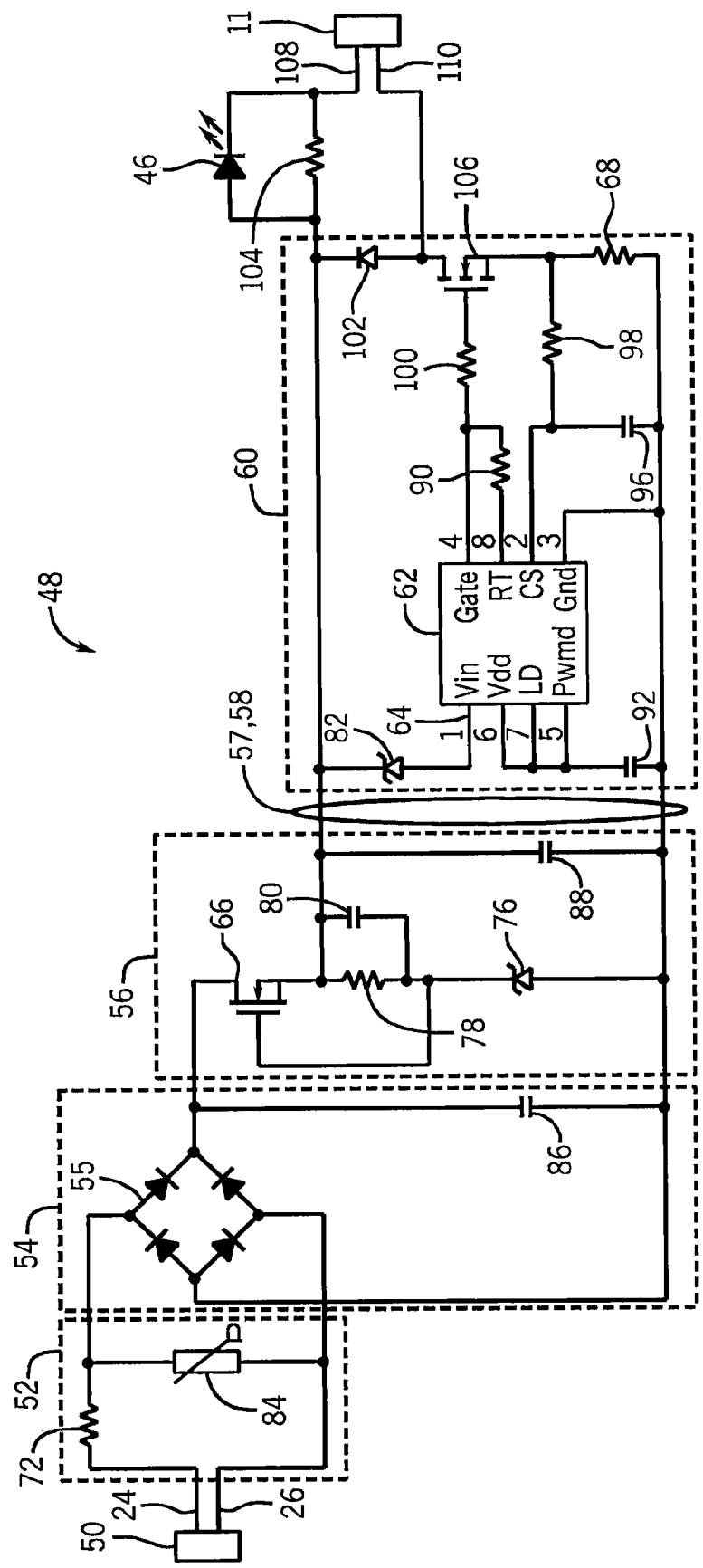
FIG. 6 is a circuit diagram of an exemplary control circuit such as that illustrated in FIG. 3.

FIG. 6 illustrates an exemplary implementation of the functional block diagram illustrated in FIG. 3. Referring to FIG. 6, control circuit 48 receives input control signals 50 via lines 24 and 26. In the circuit configuration of FIG. 6, either alternating current or direct current input control signals may be applied. A signal conditioning circuit 52 may include a resistor(s) 72 that limits current through the circuit. An MOV 84 may be used to protect the circuitry from over voltage transients, but due to size constraints, it may be a rather low energy device. The resistor 72 in series with the input further absorbs some of the transient energy, and also helps with conducted EMI.

The configuration of FIG. 6 is particularly adapted to an input voltage rating of between about 24V AC/DC to about 240V AC/DC, although other configurations and ratings can be envisaged. After passing through the signal conditioning circuit 52, the input control signals 50 are then applied to rectifier circuit 54. In some embodiments, a 0.5 A 600V full wave bridge 55 may be used. A capacitor 86 may follow the bridge 55 to limit conducted EMI. In some embodiments, a 0.022 uF 630V ceramic capacitor, for example, may be used. The input control signals are then routed to DC bus 58, across which linear regulator circuit 56 is coupled.

As previously discussed, in regard to the linear regulator circuit 56, with the depletion mode FET 66, the gate voltage must be several volts below the source to turn off conduction. The linear regulator 56 is basically connected as a follower where the gate voltage is determined by the zener diode 76. The source will rise to the zener voltage minus the gate turn-off voltage (about −2.5V). Any additional voltage on the drain will be simply dropped across the FET. Because the FET 66 gate doesn't require any current, a 1 Meg ohm pull-up resister 78 may be used. The capacitor 80 in parallel with the resistor 78 helps the initial rise time on the intermediate bus 57 when the relay 10 is switched on. It also limits the degree to which the linear regulator 56 tries to regulate the PWM frequency ripple.

AC operation of the coil 11 may require some bulk capacitance to maintain the coil in an energized condition when the input voltage swings through zero. A survey of typical relay bases showed a range from about 0.44 uF to about 2 uF for a capacitor for this purpose. Ceramic capacitors rated at 200V to 250V in a reasonable 2220 size package can be obtained up to about 2.2 uF. A 1 uF 250V capacitor 88 may be chosen knowing that it could be increased if necessary, or even reduced to reduce cost if there was no impact on operation.

Buck converter 62 may be a peak current controlled buck converter. According to an application note, this type of controller can become unstable for duty cycles over 50% and they recommend using the device in a constant off time mode.

Typically, the switching frequency of a buck converter is designed around 100 kHz to keep the inductor and output filter capacitor small. However, the large inductance of the relay coil 11 and that the buck converter 62 is not being used to generate a clean DC level allows the design to utilize a much lower frequency. This keeps the EMI low and also lowers losses that are directly related to the switching frequency.

The fixed off-time may be set by a single resistor 90. The approximate minimum duty cycle would be the ratio of the approximately 112.5V intermediate bus voltage 58 and the voltage drop on the relay 10 plus the LED 46 at 12.5 mA. This would calculate to be about 13V or 12%. Generally, it is a good idea to keep resistor values below 1 Meg ohm to prevent moisture and other environmental effects from affecting the value. With the 1 Meg ohm resistor 90, the off-time would be about 41 usec. A 12% duty cycle means the total period would be calculated to be around 47 usec (21 kHz) with a 6 usec on-time.

Buck converter 62 may have an internal power supply that can operate, in one example, from about 8V to about 450V. This internal power supply may need an external bulk filter capacitor. Based on application examples, a 4.7 uF 10V ceramic capacitor 92 may be selected, but specified a 0805 package so that the capacitor 92 could be increased to 10 uF if necessary. optionally, it could dropped, such as to 2.2 uF, to reduce cost if there was no impact on operation.

As discussed above, the current should be set to at least about 12.5 mA. The shunt resistor 68 may be sized so that it will have about a 0.25V drop at the desired current. By calculation, this means the shunt resistor should be about 20 ohms. The next lower standard resistor value of 19.6 ohms may be selected to hedge against other tolerances, thus setting the actual nominal current to about 12.7 mA.

Application data for the buck converter 62 recommended an RC low-pass filter be inserted between the shunt resistor 68 and the converter 62. The low-pass filter may be used to remove any switching glitches caused by having the rather significant inductive load of the relay coil 11. The capacitor 96 in the filter keeps the high frequency impedance at the buck converter 62 low. In this embodiment, a 0.01 uF capacitor 96 may be used and was as large as responsibly possible. The RC time constant of the filter needs to be several times shorter than the minimum pulse width so it doesn't impact the measured peak current. The on-time is about 6 usec, so using a 1 usec time constant means the resistor 98 needs to be about 100 ohms. This appears to be reasonable given that the shunt resistor 68 impedance is approximately 5 times lower.

A typical buck converter configuration uses a flyback diode to circulate the current when the power switch is turned off. The diode needs to be at least a fast diode to limit the switching transient. In this embodiment, a 1 A 200V ultra fast diode 102 may be selected. The current rating of the diode 102 may be lowered to reduce cost if there was no impact on operation.

LED 46 is provided in series with the pre-regulator circuit 56 on one side of the DC bus 57 to provide an indication of the operative state of the device (i.e., powered or unpowered). In this embodiment, a green LED 46 was chosen, which usually has about a 1.8V drop. Any LED would put out significant light at 12.5 mA, so a resistor 104 was added in parallel to the LED 46 to adjust the LED brightness. With experimentation, a 348 ohm resistor 104 reduced the brightness to an acceptable level for the particular LED used.

The switching FET 106 may have a lower voltage rating than the linear regulator FET 66 because the maximum voltage applied and the current applied are lower. When FET 106 is switched on or off, it switches very fast and may induce transients. Optionally, a gate resister 100 may be included in series with the gate of the FET 106 to slow the FET's switching speed.

Finally, terminals 108 and 110 are provided for coupling the relay coil 11 to the circuit 48. In the embodiment described above, terminals 108, 110 lead to contacts 32 (see FIG. 1) for coupling to the relay.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

I claim:

1. A wide input voltage power supply circuit for a load, the circuit comprising:
    a first regulation stage comprising a linear regulator circuit configured to maintain a bus voltage within a predefined voltage range when an input voltage exceeds a predefined input level, the linear regulator circuit comprising a first FET coupled to a first zener diode; and
    a second regulation stage comprising a buck converter circuit configured to regulate an average bus voltage to a predetermined load level, and including an under voltage lockout configuration, the under voltage lockout configured to set a minimum turn-on voltage for the load, the under voltage lockout in series with a second zener diode so as to set the minimum turn-on voltage for the load.

2. The system according to claim 1,
wherein the predefined voltage range is between 80V and 120V when the predefined input level is about 120V.

3. The system according to claim 1,
wherein the input voltage range is between 24V AC/DC to 240V AC/DC.

4. The system according to claim 1,
wherein the load comprises a 12V relay.

5. A two stage relay control circuit comprising:
    a relay including a relay coil;
    a first regulation stage comprising a linear regulator circuit configured to maintain an input voltage at a regulated bus voltage between 80V and 120V when the input voltage exceeds a predefined input level, the linear regulator circuit comprising a first FET coupled to a first zener diode;
    a second regulation stage comprising a buck converter circuit configured to further regulate an average bus voltage to a predetermined load level and to set a minimum turn-on voltage for the load, the minimum turn-on voltage for the relay coil being set with an under voltage lockout configuration, the under voltage lockout configuration in series with a second zener diode; and
    an LED configured to indicate the conductive state of the two stage relay control circuit.

6. The system according to claim 5,
wherein the average bus voltage is regulated to a maximum coil voltage that the relay coil can tolerate.

7. The system according to claim 5,
wherein an input voltage range ratio is about 1:15.

8. A two stage relay control circuit comprising:
    a relay including a relay coil;
    a signal conditioning circuit configured to regulate an input voltage;
    a rectifier circuit configured to rectify the input voltage;
    a first regulation stage comprising a linear regulator circuit configured to maintain the input voltage at a regulated bus voltage between 80V and 120V when the input voltage exceeds a predefined input level, the linear regulator circuit comprising a FET coupled to a first zener diode;
    a second regulation stage comprising a buck converter circuit configured to further regulate an average bus voltage to a predetermined relay coil level, and to set a minimum turn-on voltage for the relay coil, the minimum turn-on voltage being set with a second zener diode in series with an under voltage lockout configuration; and an LED configured to indicate the conductive state of the two stage relay control circuit.

9. The system according to claim 8,
wherein the predefined input level is about 120V.

10. The system according to claim 8,
wherein the input voltage range ratio is about 1:15.

11. The system according to claim 8,
wherein the minimum turn-on voltage for the relay coil is set with an under voltage lockout configuration.

12. The system according to claim 8,
wherein the FET is a depletion mode FET.

* * * * *